(12) United States Patent
Turgeon

(10) Patent No.: US 7,386,516 B2
(45) Date of Patent: Jun. 10, 2008

(54) SYSTEM AND METHOD FOR PROVIDING SECURE SERVICES OVER PUBLIC AND PRIVATE NETWORKS USING A REMOVABLE PORTABLE COMPUTER-READABLE STORAGE

(75) Inventor: Paul Charles Turgeon, Fort Collins, CO (US)

(73) Assignee: Metavante Corporation, Milwaukee, WI (US)

( * ) Notice: Subject to any disclaimer, the term of this patent is extended or adjusted under 35 U.S.C. 154(b) by 801 days.

(21) Appl. No.: 09/394,143

(22) Filed: Sep. 10, 1999

(65) Prior Publication Data

US 2003/0014371 A1 Jan. 16, 2003

(51) Int. Cl.
G06Q 99/00 (2006.01)
H04K 1/00 (2006.01)
H04L 9/00 (2006.01)

(52) U.S. Cl. .......................... 705/65; 705/64; 705/67; 705/78; 705/79

(58) Field of Classification Search .................... 705/1, 705/50, 51, 64, 35, 39, 40, 41, 42, 65, 67, 705/78, 79
See application file for complete search history.

(56) References Cited

U.S. PATENT DOCUMENTS

| | | | | |
|---|---|---|---|---|
| 4,259,720 A | * | 3/1981 | Campbell | 705/71 |
| 4,500,750 A | * | 2/1985 | Elander et al. | 705/72 |
| 4,755,940 A | * | 7/1988 | Brachtl et al. | 705/44 |
| 4,827,508 A | * | 5/1989 | Shear | 705/53 |
| 4,906,828 A | | 3/1990 | Halpern | 235/379 |
| 5,220,501 A | | 6/1993 | Lawlor et al. | 364/408 |
| 5,222,136 A | * | 6/1993 | Rasmussen et al. | 380/266 |
| 5,228,084 A | * | 7/1993 | Johnson et al. | 705/71 |
| 5,371,797 A | * | 12/1994 | Bocinsky, Jr. | 705/70 |
| 5,453,601 A | | 9/1995 | Rosen | 235/379 |
| 5,457,746 A | | 10/1995 | Dolphin | 380/4 |
| 5,539,828 A | | 7/1996 | Davis | 380/50 |
| 5,590,197 A | * | 12/1996 | Chen et al. | 705/65 |

(Continued)

FOREIGN PATENT DOCUMENTS

EP 865008 A2 * 9/1998

OTHER PUBLICATIONS

"Card Frontiers: Gemplus, Verifone Test Encrypted PIN" Jeffrey Kutler, American Banker, Feb. 4, 1998, v 163, Issue 23, p. 14.*

*Primary Examiner*—Calvin L. Hewitt, II
(74) *Attorney, Agent, or Firm*—Townsend and Townsend and Crew LLP

(57) ABSTRACT

A system and method provides secure access over public communication lines using encrypted information on a removable, portable storage medium. Information relating to a customer's financial account is encrypted and stored to a disk. When a customer desires to purchase goods and/or services on-line or access his financial account, he inserts the CD into a disk drive of a personal computer. The encrypted information is retrieved from the disk and transmitted, via public communications lines, to a computer maintaining a Web site for providing the requested goods and/or services. The computer then forwards the encrypted information to a secure network. A processor on the secure network processes the customer's request, and denies or approves the transaction based on the received information. The results of such processing are returned to the computer maintaining the Web site for completing or aborting the transaction.

8 Claims, 8 Drawing Sheets

U.S. PATENT DOCUMENTS

| | | | |
|---|---|---|---|
| 5,623,547 A | 4/1997 | Jones et al. | 380/24 |
| 5,661,285 A * | 8/1997 | Elrick et al. | 235/380 |
| 5,677,953 A | 10/1997 | Dolphin | 380/4 |
| 5,734,823 A | 3/1998 | Saigh et al. | 395/200.06 |
| 5,771,291 A * | 6/1998 | Newton et al. | 713/185 |
| 5,850,446 A | 12/1998 | Berger et al. | 380/24 |
| 5,870,724 A | 2/1999 | Lawlor et al. | 705/42 |
| 5,889,863 A | 3/1999 | Weber | 380/25 |
| 5,903,881 A * | 5/1999 | Schrader et al. | 705/42 |
| 5,913,202 A * | 6/1999 | Motoyama | 705/35 |
| 6,044,046 A * | 3/2000 | Diezmann et al. | 369/14 |
| 6,073,124 A * | 6/2000 | Krishnan et al. | 705/59 |
| 6,098,053 A | 8/2000 | Slater | |
| 6,173,269 B1 * | 1/2001 | Solokl et al. | 705/35 |
| 6,195,357 B1 * | 2/2001 | Polcyn | 370/41 |
| 6,327,578 B1 * | 12/2001 | Linehan | 705/65 |
| 6,505,178 B1 | 1/2003 | Flenley | |
| 6,526,489 B1 | 2/2003 | Kikuchi et al. | |
| 6,553,492 B1 | 4/2003 | Hosoe | |

\* cited by examiner

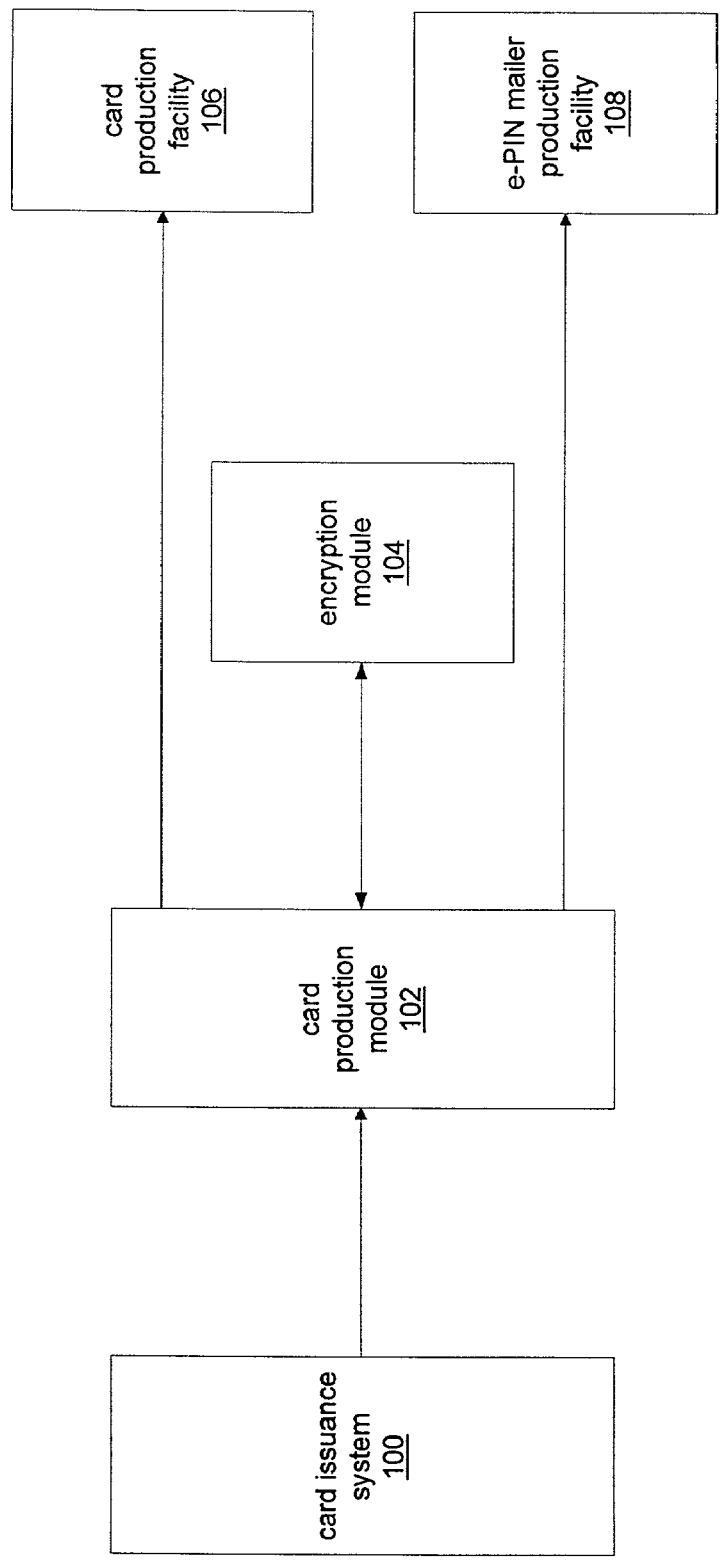

SYSTEM AND METHOD FOR PROVIDING SECURE SERVICES OVER PUBLIC AND PRIVATE NETWORKS USING A REMOVABLE PORTABLE COMPUTER-READABLE STORAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates generally to electronic commerce and financial transactions. More particularly, the present invention relates to a system and method for providing secure environment to carry out electronic payments or other financial transactions over the Internet or other open network using the existing secure network, such as the automated teller machine (ATM) or point-of-sale (POS) network maintained by NYCE®, CIRRUS®, etc.

According to a recent article of a major business newspaper, electronic commerce via the Internet has seen a significant increase over the last year. As more and more people are attracted by the convenience and advantages of on-line shopping and to attract even greater number of customers, Web merchants need to address several issues concerning e-commerce.

First and foremost is the issue of security. Fraud in transactions may cost Web merchants many thousands of dollars in lost revenues. Furthermore, to do on-line purchases without any reservations, customers need to feel safe and assured that their confidential information will not be intercepted and misused by fraudulent users or by an unscrupulous merchant.

Also quite important is the second issue relating to on-line purchases, which is ease and convenience. Web merchants need Web sites that are user-friendly for e-commerce transactions, allowing even a novice computer user to purchase goods and/or services with minimum of experience and knowledge. In addition, the amount of effort expended on transactions is likely to be directly proportional to the customer's attention span and time. Customers have to be enabled to do a transaction quickly on a Web site because of today's fast paced environment, or the Web merchant risks losing that customer.

Currently, to make a purchase over the Internet, Web merchants' sites require purchasers to complete a long form by providing personal information on-line. It is not uncommon for customers to fill in a form consisting of several pages. To enter all the requested information, the customers must scroll down to see the entire form or go to another page for continuation. In addition, if one of the requested items of information, such as name, address, e-mail address, phone numbers, etc., is accidentally skipped by the customer, he is required to return to the form to add the missing information. Furthermore, entering information on-line is subject to typographical errors causing problems for Web merchants and customers alike.

Furthermore, the conventional Web merchant site offers an option of phoning in the card information if the customer does not feel safe in providing his/her credit card or debit card information. Such option, however, partially defeats the advantages enjoyed by the merchant in selling goods and/or services via the Internet. Attending to customer information supplied over the phone is not only time-consuming but it requires the Web merchant to have staff for manning the phones and to maintain a sufficient number of lines. The additional expenses for the Web merchant and other attendant problems, such as forgetting to phone in the credit card information for example, present additional disadvantages of the current systems and techniques for performing electronic transactions over the Internet.

A need therefore exists for a system and method that addresses the above concerns and overcomes the disadvantages of conventional on-line payment systems.

BRIEF SUMMARY OF THE INVENTION

It is an object of the present invention to provide a secure environment for financial services conducted over a public network.

It is another object of the present invention to provide a method for purchasing goods or services on-line.

It is yet another object of the present invention to authenticate on-line users conducting financial services over a public network.

The above and other objects are achieved by a system for providing financial transactions over a public network accessible by customers via respective network access devices with modems and over a private network accessible by financial institutions via computers with modems. The financial institutions maintain respective financial accounts for the customers. The inventive system includes a network access device including a programmable controller for executing code and a memory for storing a browser software to interface with the public network. A customer uses the network access device and a computer-readable portable storage medium to access a customer's financial account via the public network. The computer-readable portable storage medium has encrypted and unencrypted information recorded thereon pertaining to the customer's financial account. A decryption processor, connected to the network access device via the public network, is operative to decrypt the encrypted information retrieved from the storage medium such that a financial institution, connected to the decryption processor via the private network, determines an access to the customer's financial account on the basis of the decrypted information.

In accordance with one aspect of the present invention, the unencrypted information selectively includes a name of the financial institution maintaining the customer's financial account, an audio message and advertising information pertaining to the financial institution.

In accordance with another aspect of the present invention, the computer-readable portable storage medium is a CD-ROM produced by a card production facility, based on a card production file, for mailing the CD-ROM to the customer for use in the network access device.

BRIEF DESCRIPTION OF THE DRAWINGS

The present invention is illustrated in the figures of the accompanying drawings which are meant to be exemplary and not limiting, in which like reference characters are intended to refer to like or corresponding parts, and in which:

FIG. 2 shows a block diagram of the system for creating and issuing e-commerce debit cards for use in obtaining financial services over the Internet;

DETAILED DESCRIPTION OF THE PREFERRED EMBODIMENTS

Figure 1A:
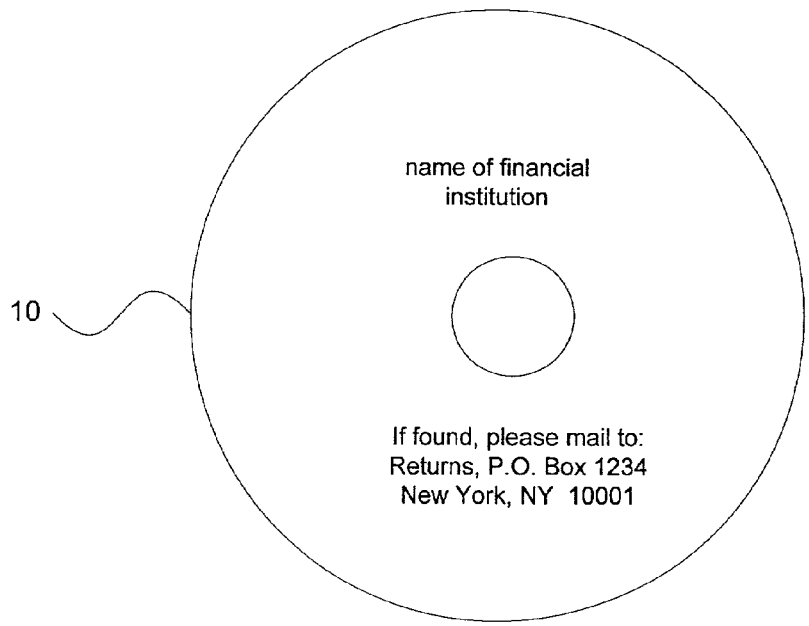
FIG. 1a shows a block diagram of an e-commerce debit card as a computer-readable storage medium representatively exemplified by CD-ROM.

As a general overview, the present invention includes a system and method for providing secure financial services over public communication lines, such as the Internet, intranet or any other network, using encrypted information on a removable, portable storage medium. In one embodiment of the present invention, information relating to a customer's bank account is stored to a disk which becomes his e-commerce debit card. For each customer, the stored information may include customer's name, name and routing number of an issuing bank/financial institution, customer's account number, etc. This information is encrypted prior to being stored to the disk. Disks with the encrypted information are mailed to respective customers for use in debit purchases over the Internet.

In operation, when a customer desires to purchase goods and/or services on the Internet, he inserts his e-commerce debit card in the form of CD-ROM into a CD-ROM drive of a personal computer. The customer is then prompted to enter his Personal Identification Number (PIN) for the bank account used in the purchase transaction. A microprocessor in the personal computer executes instructions for retrieving the encrypted information from the CD-ROM and for transmitting the retrieved information to a server for a Web merchant's site for selling the requested goods and/or services. The server forwards the encrypted information, along with a request for debiting a specified amount, over the public communication lines to a secure network for automated teller machine (ATM) or point-of-sale (POS) transactions, such as NYCE® or Cirrus® networks. A processor located on the secure network processes the customer's debit request, and denies or approves the transaction based on the customer's available balance in his account. The results of such processing are returned to the Web merchant's site for completing or terminating the transaction.

According to this embodiment of the present invention, financial institutions issue e-commerce debit cards to those cardholders wishing to use their demand deposit accounts to make secure purchases over the Internet. A retail web site API specification is developed for use by vendors and builders of retail Web sites. In addition, a network decryption/interface module to which retail merchants connect their systems is also developed.

The card is loaded with a "blob" whose contents are encrypted using, for example, triple DES encryption. The blob contains the magnetic stripe information, typically found on conventional ATM cards, as well as the cardholder's name and statement address information.

The cardholders are given an "e-PIN" which will resolve the actual PIN. By using a separate e-PIN for the Internet commerce and similar transactions, the risk of introducing fraud at the ATM and POS is reduced.

The Web site API specifies how the "check out" screen (software) button works on Web merchant's sites and how the sites interface with the consumer computers and with merchants Web sites.

The network decryption/interface processor receives the encrypted blob from the merchant system, decrypts it and creates standard ISO 8583 debit POS messages, which it sends to the appropriate issuer processor. It also receives standard ISO 8583 debit POS response messages from the issuer processor and creates Web merchant response messages, which it sends to the retailer. These response messages contain only approval/denial response codes, trace information and, for consumer ease of use, may contain the information necessary to populate the shipping address screens on the Web merchant's site.

Card information is never available, except in highly secure encrypted form, throughout the life of the transaction at the consumer's PC or over the Internet. Only when a message reaches the network decryption/interface processor is the card information converted to a form normally used in network messages.

A representative transaction over a public network may be as follows:

The consumer, using her/his PC, chooses the "Debit" button at the checkout stand on the retail Web merchant's site.

The Web merchant's server downloads an active Web component module to a consumer's PC over a secure connection.

The active Web module prompts the consumer to insert his/her debit card and enter e-PIN.

The active Web module reads the blob from the card and sends the blob along with the e-PIN to the module on the Web merchant's site.

The active Web module closes in the consumer's PC.

The module on the Web merchant's site establishes a secure session (could be either a Web link or a dedicated link) with the network decryption/interface processor and forwards a request message containing the e-PIN, the blob and the merchant appended data.

The network decryption/interface processor decrypts the blob, creates a POS request message, re-encrypts the PIN and sends an ISO 8583 debit POS purchase request to a network switch for forwarding to a financial institution for approval/denial code.

The network decryption/interface processor, upon receipt of an approval response from the network switch, sends an approval response to the module on the Web merchant's site.

The shipping information screen is then populated using the information in the response message for display to the consumer and for completion of the session.

Figure 1B:
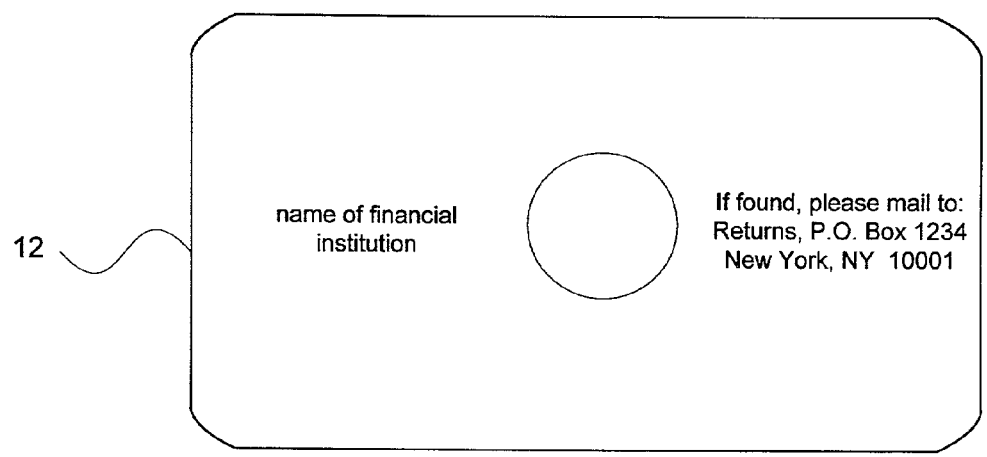
FIG. 1b shows another representation of the e-commerce debit card in block diagram form.

FIG. 1a shows an e-commerce debit card as a computer-readable storage medium representatively exemplified by CD-ROM 10, containing customer information and other data for use in making debit purchases over the Internet in accordance with the present invention. The CD-ROM based card provides access to electronic commerce (e-commerce) from home personal computers using a CD-ROM drive (external or internal), without any modifications or additions to the hardware setup. The data stored on the e-commerce debit card is securely encrypted as described in detail below. FIG. 1b shows another representation of the e-commerce debit card which has the shape and size of the conventional debit card to provide familiar metaphor. The disk 12 depicted in FIG. 1b fits in a tray of a CD-ROM drive. It is understood, of course, that the removable computer-readable storage medium containing encrypted data according to the present invention may take on other shapes and sizes depending on customer preference and widespread usage of PC devices/drives. In another embodiment of the present invention, the removable computer-readable storage medium may include a programmable controller with memory for storing instruction code and data therein.

FIG. 2 shows a block diagram of the system for creating and issuing e-commerce debit cards for use in making debit purchases over the Internet. Shown in this figure is a block diagram of card issuance system 100 for generating a computer file of a predetermined format for storage on any computer-readable storage medium. The generated computer file contains information about the card holder's account and a financial institution which maintains his/her account. Representative information in the computer file may include account number, account holder's name, address, telephone number (day and/or evening). Further, the representative file information may include the name of the financial institution and may further include a routing number and address of the branch at which the account was opened. Card issuance system 100 also generates another file containing text, graphical banner advertisements, audio message, etc. relating to the issuing bank/financial institution.

Further shown in FIG. 2 is a block diagram of card production module 102 for generating yet another computer file based on data received from card issuance system 100 and from encryption module 104, as explained in detail hereinbelow. Card production module 102 may be implemented on a computer having a computer-readable storage medium for storing code and a programmable controller/microprocessor capable of executing the code for generating the computer file. The computer may be physically situated in card production facility 106 for providing cards to account holders in accordance with the present invention. As shown in FIG. 2, the computer is remotely located from card issuance system 100 such that secure dedicated lines communicatively couple card production facility 106 and card issuance system 100 for transfer of data and control signals.

FIG. 2 also shows a block diagram of encryption module 104 for encrypting data received from card production module 102. Encryption module 104 may be implemented on a physically secure computer having a computer-readable storage medium for storing code and a programmable controller/microprocessor capable of executing the code for encrypting data. The encryption computer may be physically situated in e-PIN mailer production facility 108 for providing e-PIN mailers to account holders in accordance with the present invention. As representatively shown in FIG. 2, e-PIN mailer production facility 108 may be either remotely located from or co-located with card production module 102 and card production facility 106.

The operation of the system depicted in block diagram form in FIG. 2 is described next, with reference to the card issuance process flowchart shown in FIG. 3. In step 300 an information file containing account holder's information and bank information as described above is generated by card issuance system 100 for a particular customer. Another information file is further generated to include bank information screen and audio message for display on a PC monitor. In step 302 a PIN mailer file containing a personal identification number (PIN) for accessing the customer's bank account is generated by card issuance system 100. The customer's PIN is a predetermined number of alphanumeric characters individually generated for each account holder. The generated information files and PIN mailer file are then separately transferred from card issuance system 100 to card production module 102. In step 304, the PIN is extracted from the PIN mailer file, and is then sent from card production module 102 to encryption module 104 for encryption. In accordance with one embodiment of the present invention, the PIN is encrypted using first encoding data, such as public and private keys or other effective cryptographic algorithms as known to those skilled in the art, supplied by the financial institution that maintains the account. The encoding data, i.e., keys, are sent and stored separately from the information file that includes customer and bank information as described above.

Figure 3:
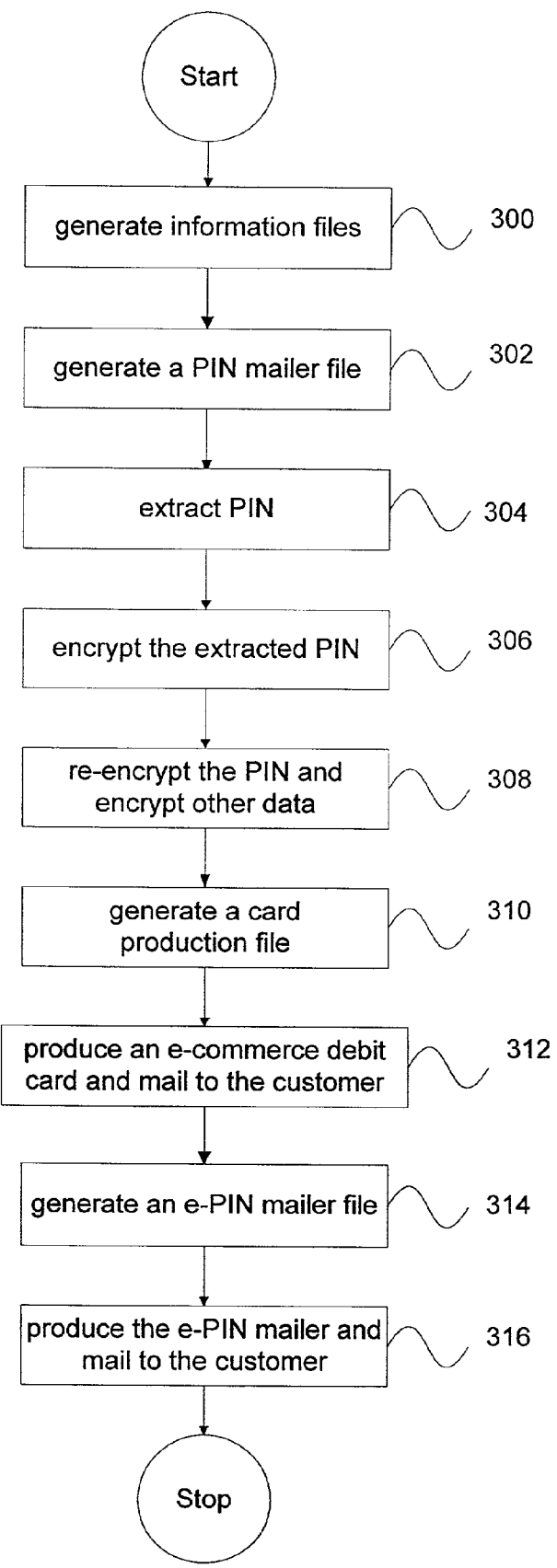
FIG. 3 shows a card issuance process flowchart for illustrating the operation of the system depicted in block diagram form in FIG. 2.

Continuing with the description of FIG. 3, in step 306 encryption module 104 encrypts the customer's PIN and returns it to card production module 102. After receiving the encrypted PIN, card production module 102 sends the information file and the encrypted PIN to encryption module 104 for encrypting the entire information. That is, customer's PIN is encrypted separately and independently of the subsequent encryption of the entire information. According to one embodiment of the present invention, the entire information comprising account holder's and bank's information as well as the encrypted PIN is encrypted using second encoding data, such as public and private keys or other cryptographic algorithms as known to those skilled in the art, supplied by the financial institution maintaining the account. Similar to the first encoding data, the second encoding data may be contained in the above-described information file.

In step 308 encryption module 104 encrypts the previously encrypted PIN and also encrypts account holder's and bank's information using the second encoding data, and returns the encrypted data to card production module 102. In step 310, after receiving the encrypted data, card production module 102 generates a card production file which is ready to be transferred to the customer's e-commerce debit card. The card production file includes the transaction routing information, unencrypted bank's logo and audio information, encrypted account holder's and bank's information, and twice encrypted customer's PIN as described above. In step 312, the card production file is transferred from card production module 102 to card production facility 106, wherein the file data is written to the customer's e-commerce debit card which is subsequently mailed to the customer who may or may not be the account holder.

In step 314 card production module 102 generates an e-PIN mailer file containing an e-PIN which resolves the customer's actual PIN. The e-PIN is a predetermined number of alphanumeric characters and is shorter in length than the actual PIN. The e-PIN is requested by an active Web module, such as an activeX module or Java applet, as explained in detail below. If correctly entered by a customer, the e-PIN in combination with the customer's PIN provides access to the customer's account for debit purchases. The generated e-PIN mailer file is then transferred from card production module 102 to e-PIN mailer production facility 108. In step 316 e-PIN mailer production facility creates the e-PIN mailer ready for delivery, and subsequently mails it to the bank's customer.

It will be appreciated that according to the present invention, no changes are required to the financial institution's card issuance and on-line authorization systems. In addition, there will be no changes to the existing debit network on-line processing systems.

Figure 4:
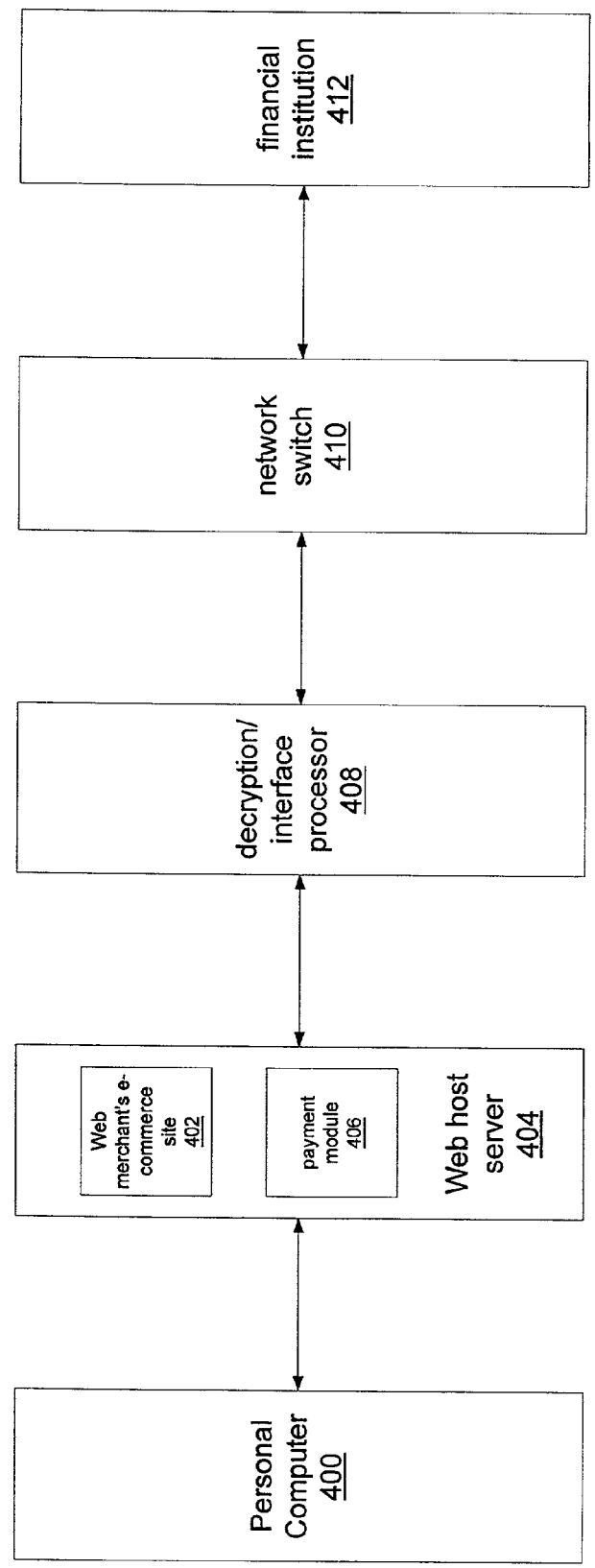
FIG. 4 shows, in block diagram form, a system which is utilized by a consumer to obtain financial services, for example to make secure debit purchases over a public network, such as the Internet, using his/her personal e-commerce card and personal computer.

FIG. 4 shows, in block diagram form, a system which is utilized by a consumer to make secure debit purchases over a public network, such as the Internet, using his/her personal e-commerce card and personal computer in accordance with the present invention. Shown in FIG. 4 is a block diagram of personal computer (PC) 400 with Internet access and CD-ROM drive. The Internet access may be provided via a cable modem or a dial-up modem and browser software, such as Netscape® or Microsoft Explorer® in PC 400. In a preferred embodiment of the present invention, the disk drive is a CD-ROM drive for reading data from disks. Further shown in FIG. 4 is a block diagram of Web merchant's e-commerce site 402 which resides on Web host server 404 (computer). Also residing on Web host server 404 is merchant payment module 406 for use in the present invention as will be explained in detail below. PC 400 and Web host server 404 transfer data between each other via either publicly switched or dedicated lines of communication. Web host server 404 is communicatively coupled with decryption/interface processor 408 for processing customer's, bank's and Web site's data during the purchase transaction. Decryption/interface processor 408 is connected to network switch 410 for routing data to and from the financial institutions maintaining purchasing customers' accounts. Network switch 410 is part of the current secure network used by financial institutions to offer various services to consumers, such as cash withdrawal/deposit, bill payment, etc., via ATM and point-of-sale (POS) terminals. Decryption/interface processor 408 may be implemented on a remote, stand-alone computer connected via secure dedicated lines to network switch 410. Alternatively, decryption/interface processor 408 may locally reside with network switch 410. Located as nodes on the network are various financial institutions for holding customers' accounts. One representative financial institution is shown in block diagram form as block 412 connected to network switch 410 for transferring data therebetween via secure dedicated lines.

Figure 5A:
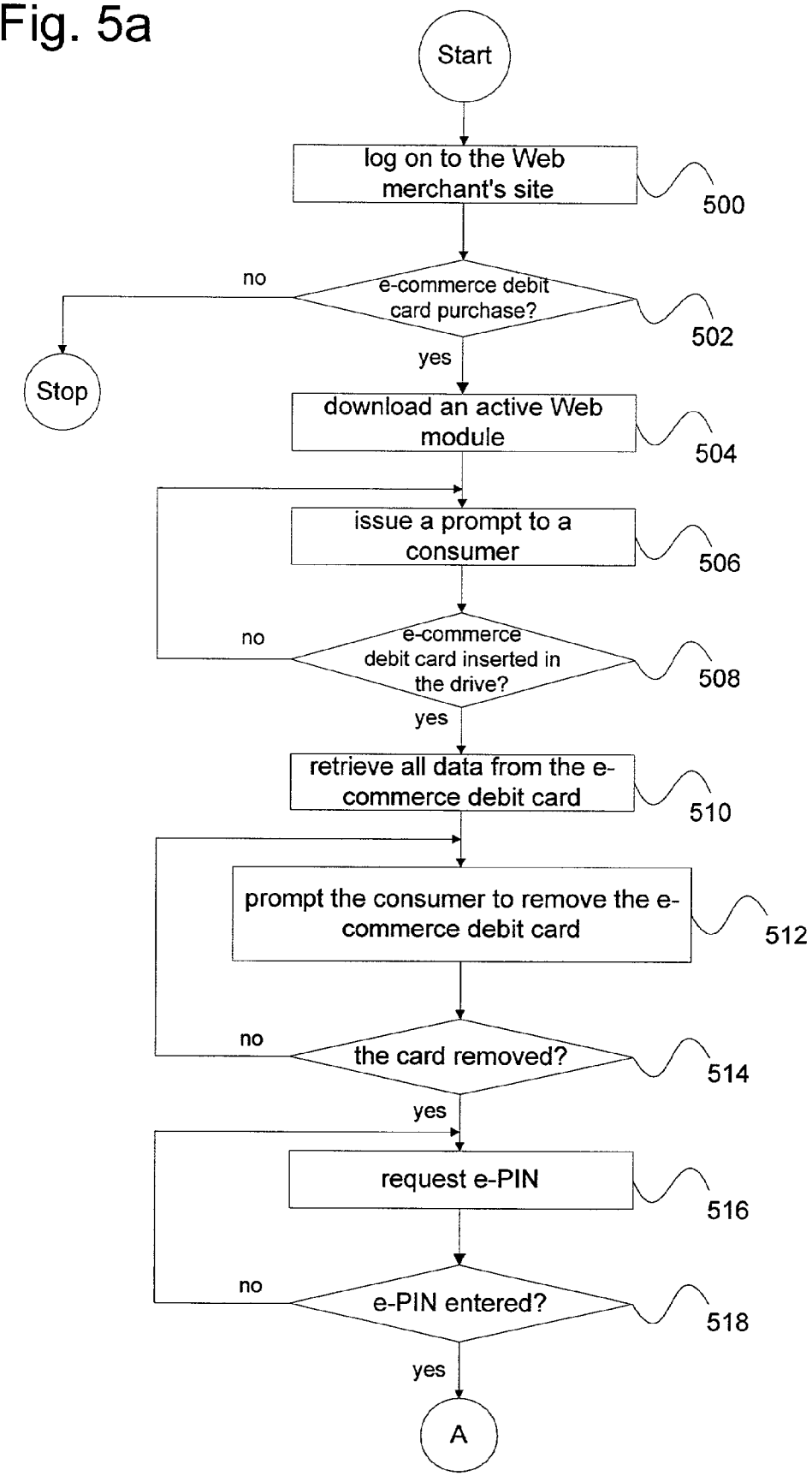
FIGS. 5a, 5b, 5c and 5d show a transaction process flowchart for illustrating the operation of the system shown in FIG. 4.

The operation of the system depicted in block diagram form in FIG. 4 is described next with reference to a representative transaction over the Internet. The description below refers to the transaction process flowchart shown in FIGS. 5a, 5b, 5c and 5d. As shown in FIG. 5a, in step 500 a cardholding consumer wishes to purchase goods and/or services over the Internet after logging on to the Web merchant's e-commerce site 402. In step 502, it is determined whether the consumer "clicked" on a screen button presented by the Web merchant's e-commerce site to indicate his desire to make a purchase with his e-commerce debit card. It is understood, of course, that in addition to the screen button, other forms of notification may be used by the consumer without departing from the spirit of the invention.

If the screen button was activated, then in step 504 Web host server (computer) downloads an active Web module, such as ActiveX or Java applet for example, to the browser running on the consumer's PC 400. Under control of the microprocessor in PC 400, in step 506 the active Web module is operative to prompt the consumer to place his e-commerce debit card in the CD-ROM drive. As an option, the active Web module may be additionally operative to open the CD-ROM drive. In step 508 it is determined whether the e-commerce debit card is in the CD-ROM drive. If so, in step 510 the microprocessor in PC 400 executing the active Web module code retrieves all data from the e-commerce debit card. The retrieved data includes, among other things, unencrypted text, graphics and audio data for display on a monitor. This personalized data, pertaining to the financial institution maintaining the consumer's financial account, includes a greeting to the customer and may optionally include an advertisement, in text, graphics and/or audio format, for other services available at the financial institution.

In step 512, under control of the microprocessor in PC 400 executing the active Web module code, the consumer is prompted to remove the e-commerce debit card from the CD-ROM drive. Optionally, the active Web module may be operative to open the CD-ROM drive while issuing the prompt to the consumer. In step 514 it is determined whether the e-commerce debit card was removed from the CD-ROM drive. If so, under control of the microprocessor in PC 400 executing the active Web module code, the CD-ROM drive is closed (if previously opened), and the consumer is requested to enter his e-PIN for resolving the actual PIN as explained above, in step 516. If entered, as determined in step 518, the retrieved data including the e-PIN and encrypted cardholder's data are transferred via a Secure Socket Layer (SSL) connection from PC 400 to merchant payment module 406 at Web host server 404 (step 520). In step 521, after the data is uploaded to the Web host server 404, a memory in PC 400 (client station) is flushed to erase data used by the active Web module, which expires on PC 400. Upon receipt of the encrypted data, in step 522 a microprocessor in Web host server 404, by executing the code of merchant payment module 406, appends merchant specific transaction data to the received data. The appended transaction data identifies the merchant and/or Web merchant e-commerce site 402, and further includes data for indicating the purchase amount to be debited to the customer's account.

In step 524 the encrypted data and appended transaction data including the unencrypted e-PIN are transferred via a SSL connection from merchant payment module 406 to decryption/interface processor 408. In step 526 decryption/interface processor 408 decrypts the cardholder's data, and in step 528 it also decrypts and re-encrypts (translates) the PIN. Since the PIN cannot be "in the clear", the operation of decrypting and re-encrypting the PIN is known as PIN translation. In step 530 decryption/interface processor 408 adds the unencrypted e-PIN, supplied by the customer as explained above, to the re-encrypted PIN. This addition of two PINs is further combined with the decrypted cardholder's data by decryption/interface processor 408 to generate an ISO 8583 POS request message that contains, among other things, information necessary for routing the message to a financial institution. In step 532 the generated ISO 8583 POS request message is sent to network switch 410.

Figure 5B:
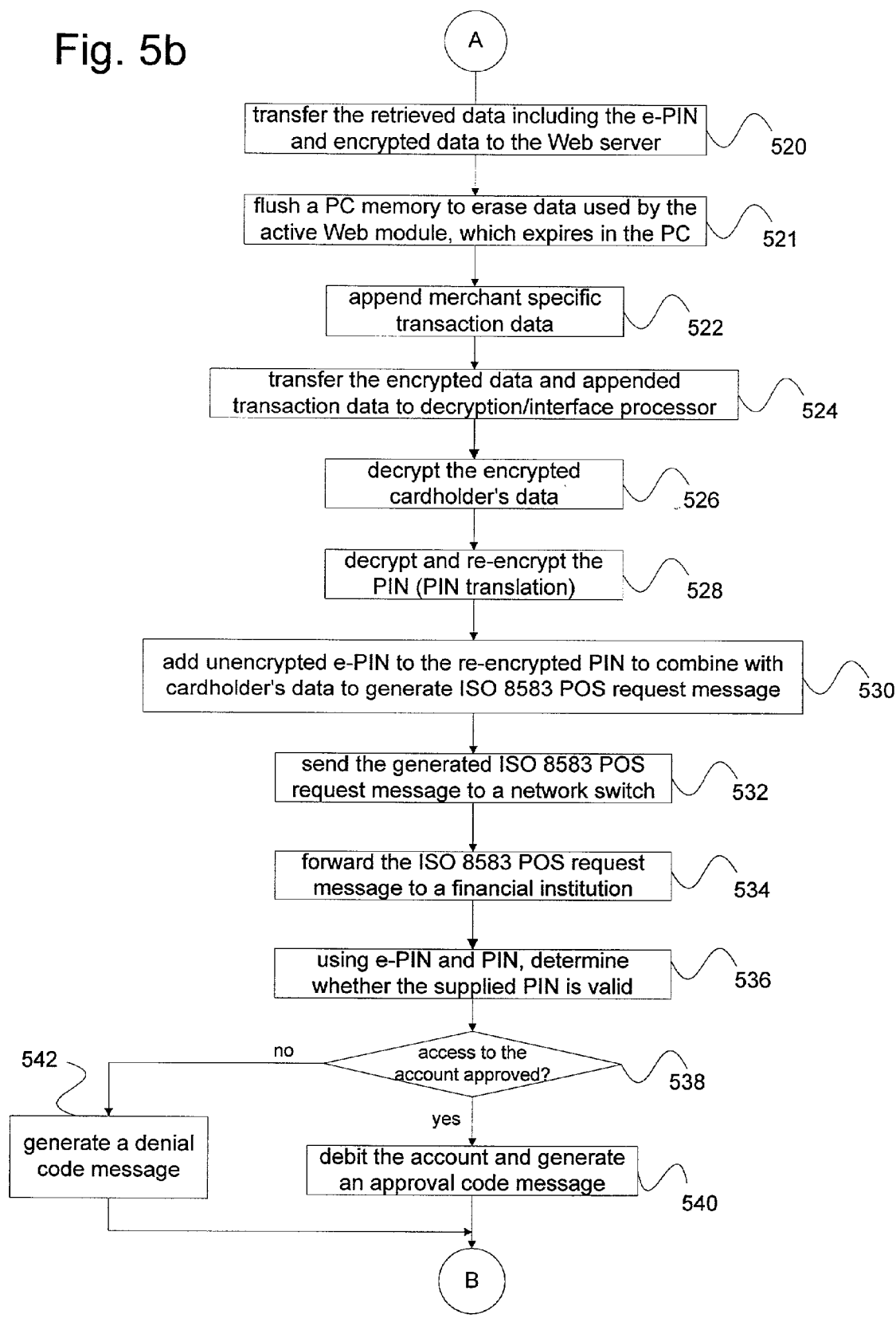
Figure 5C:
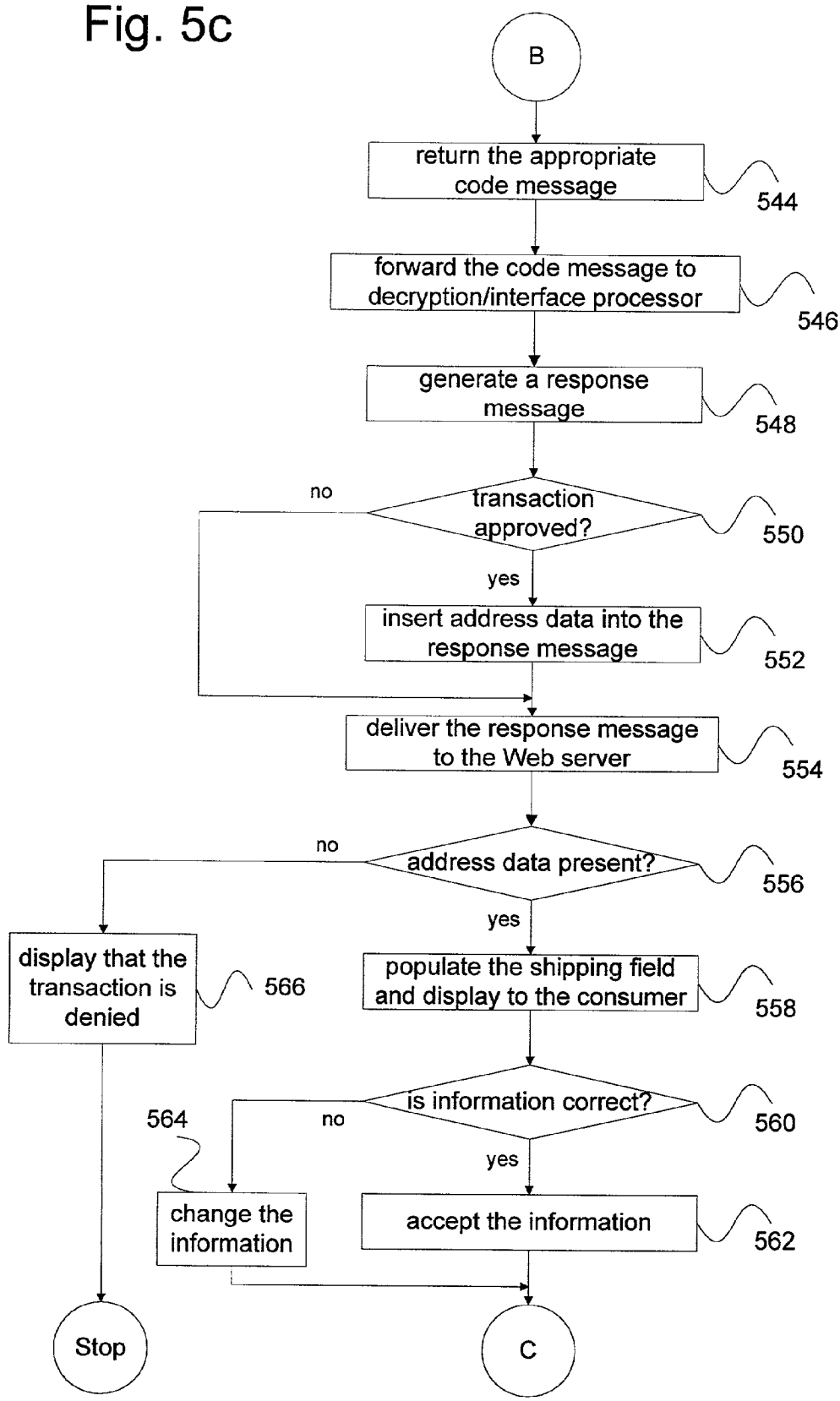

Further continuing with FIG. 5b, in step 534 network switch 410 forwards the received ISO 8583 POS request message to the appropriate financial institution. The message routing is performed on the basis of the bank routing number decrypted by decryption/interface processor 408. The transfer of information between network switch 410 and financial institution 412 occurs via the existing secure network, as mentioned above. In step 536 financial institution 412 receives the ISO 8583 POS request message and determines whether the supplied PIN is valid on the basis of the e-PIN and the encrypted PIN. If in step 538 it is determined that the access to the cardholder's account is legitimate, financial institution 412 debits the account for the requested purchase amount and generates an approval code message in step 540. If, however, the access to the consumer account is denied because of the incorrectly entered or fraudulent PIN or the account balance is insufficient for debiting the requested purchase amount, financial institution 412 generates a denial code message in step 542. In FIG. 5c, in step 544 financial institution 412 returns the appropriate code message (approval or denial) to network switch 410 for forwarding to decryption/interface processor 408 in step 546.

In step 548 decryption/interface processor 408 generates a response message on the basis of the code message received from network switch 410. If the received code message contains the transaction approval as determined in step 550, decryption/interface processor 408 inserts the cardholder's address data into the generated response message in step 552. The cardholder's address data was previously decrypted from the ISO 8583 POS request message as described above with reference to step 526.

The generated response message is then delivered to merchant payment module 406 via a SSL connection in step 554. If in step 556 it is determined that the response message contains address data, the Web merchant's e-commerce site populates the shipping fields with the cardholder's address data and displays this information, as well as the transaction amount, to the consumer for verification in step 558. Alternatively in another embodiment of the present invention, the shipping information may be formatted and supplied to the Web merchant's e-commerce site by a module external to Web host server 404. Upon reviewing the shipping address and transaction amount in step 560, the consumer determines whether the information is correct. If so, the consumer activates a "soft" button to accept the information in step 562. If information is incorrect or the consumer wishes to provide different shipping information, he can change the address and other information in step 564.

If the response message does not contain address data as determined in step 556, the consumer is notified of the denied transaction via a message on the PC monitor in step 566. At this point and at the option of the Web merchant, the consumer may be given a brief explanation as to why the transaction was denied.

Figure 5D:
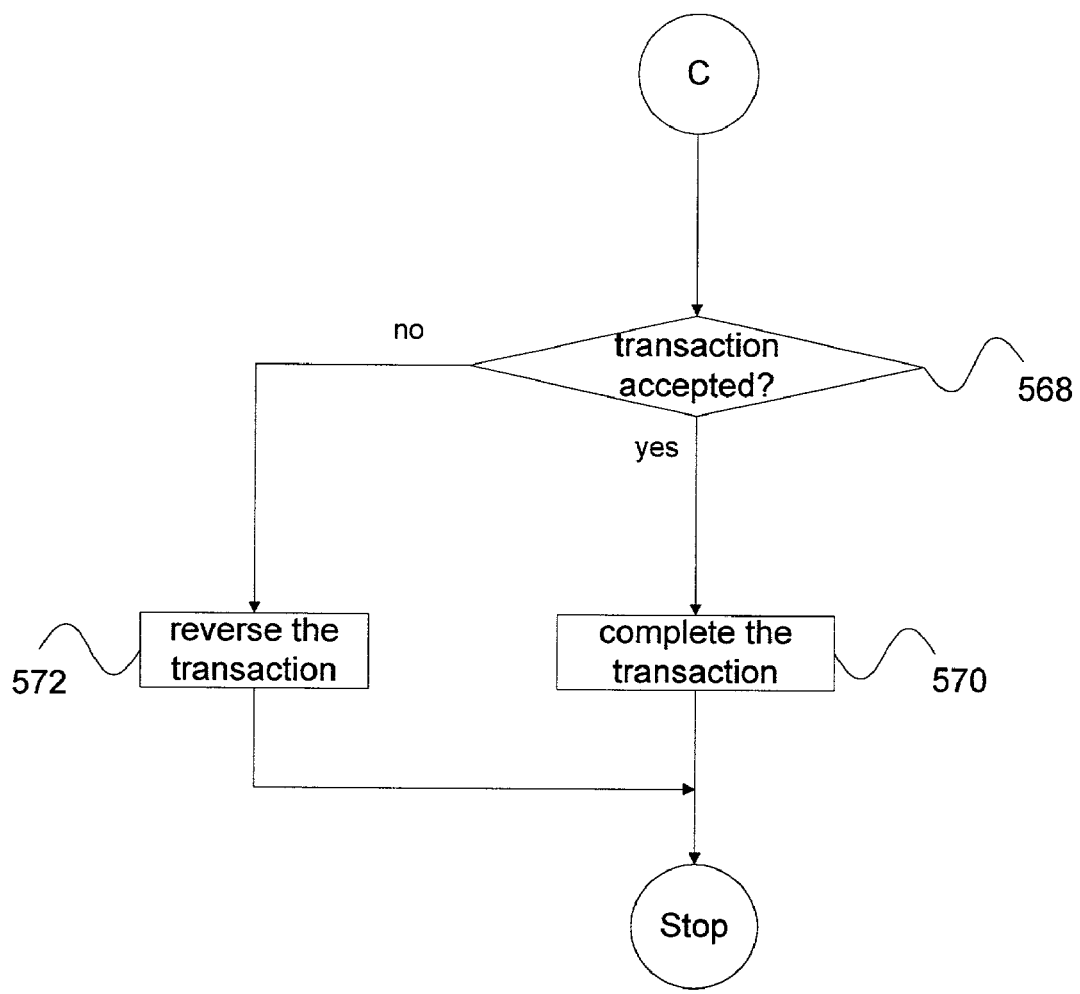

Continuing with the description of FIG. 5d, after finalizing the shipping and other information in step 562 or 564, the consumer is given the final chance to either accept or reject the transaction in step 568. If the consumer accepts, the transaction is completed by obligating the Web merchant to provide the requested goods and/or services according to the transaction in step 570. However, if the consumer changes his mind and declines to purchase the goods and/or services from the Web merchant, the transaction is reversed in step 572.

To reverse the transaction in this situation, payment module 406 in Web host server 404 prepares a message with the necessary customer information and sends the message to decryption/interface processor 408. Using the received information, decryption/interface processor 408 generates a financial reversal message in accordance with the ISO 8583 Interface Specification. The generated financial reversal message is sent to network switch 410 and subsequently to financial institution 412 for reversing the transaction. In the above example, financial institution 412 credits the previously debited amount to the customer's financial account in full compliance with the processing requirements as defined in the ISO 8583 Interface Specification.

The transaction reversal process may occur for other reasons. If, for example, the transaction "times out", a financial reversal message in accordance with the ISO 8583 Interface Specification is generated for processing by the financial institution. Namely, the transaction is aborted if a predetermined period of time allocated for response to a query or processing operation expires. This time-out, which may be intentional or unintentional due to hardware/software failure, may occur anywhere along the data transaction path, which is between the consumer's network access device and the financial institution, inclusively. In this situation, the transaction reversal process is carried out in substantially the same way as described above.

While the present invention describes messages complying with the ISO 8583 Interface Specification for processing by the secure network such as NYCE®, it is understood that other secure networks may have different interface specification requirements. In this situation, decryption/interface processor 408 or any other processing device responsible for generating the network-compliant messages will generate an appropriate message in accordance with the necessary requirements by the secure network.

It will be appreciated that the present invention has no impact on the existing card issuance system or the existing authorization processing by the financial institution. Furthermore, the present invention does not require the completion of on-line forms as in the existing e-commerce techniques. In addition, the present invention offers a high level of protection against fraud, thereby reducing the merchant's processing expense.

According to the preferred embodiment of the present invention, the e-commerce debit card is issued to access the customer's checking/savings account at the bank. It will be appreciated, however, that the present invention is not limited to debit cards or debit accounts, such as checking and/or savings. Without departing from the spirit of the present invention, customer's credit card information, for example, may be stored to a computer-readable storage medium, and an e-commerce credit card may be produced by the system of the present invention and according to the process described hereinabove. Consequently, using the e-commerce credit card at a PC or other network access device, the customer may requests his credit-issuing financial institution to approve the on-line purchase by extending credit for the transaction amount. If approved, the customer completes the transaction at a Web merchant's site, as explained hereinabove in connection with the debit purchase.

In another embodiment of the present invention, by using public lines of communication the customer uses his e-commerce card to view information stored on a secure network. In particular, a borrower may want to look at the status of his loan with a lending institution. By logging on to the lender's Web site and using the e-commerce card, the borrower may be entitled to view his loan account, the latest activity on the account, etc., in accordance with the above-described process and system of the present invention.

In this case, the borrower's e-commerce card is used to authenticate the cardholder, thereby enabling him to view personal and confidential information and also to avail himself of various services offered by the financial institution. For example, the borrower may set up on-line loan payments, whereby his checking account is regularly debited for the specified amount by accessing the lender's Web site and carrying out the steps of the transaction as described above with reference to FIGS. 1-5d.

It will be appreciated by those skilled in the art that the present invention is not limited to PC 400 for carrying out the above-described functions. The customer may use a cellular telephone, a handheld digital assistant or any other network access device containing software for accessing a network, a programmable controller with a memory storage, and means for accommodating a removable computer-readable medium, whereby the data and/or program code in that medium is transferred to/from the programmable controller.

It will be further appreciated that while the above description with reference to the process flowcharts described in FIGS. 3, 5a, 5b, 5c and 5d refers to modules, facilities and/or systems that generate, transfer, process, encrypt, send, receive, etc., it is understood that those and other operations are performed under the control of one or more processors/controllers executing computer readable program code. As known to those skilled in the art, a processor/controller retrieves the code, transfers the retrieved code to internal memory and executes code instructions from the internal memory to carry out those and other functions.

The program code, stored in computer readable media (including magnetic or optical media, and the like), directs a computer or other programmable device to function according to the flowcharts described above in connection with the preferred embodiment. An article of manufacture is thus produced for carrying out the functions of the present invention.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing financial services over a public network accessible by a plurality of customers via respective network access devices with modems and over a private network accessible by a plurality of financial institutions via computers with modems, said financial institutions maintaining respective financial accounts for said plurality of customers, at least some of said financial accounts being maintained at different ones of said financial institutions, said method comprising:

for each customer,
  receiving a computer-readable portable storage medium by a computer interfaced with a respective one of the network access devices to initiate a financial transaction;
  retrieving encrypted information from the computer-readable portable storage medium by the computer, the encrypted information identifying said each customer's financial account and including a first identifier;
  receiving a second identifier from said each customer by the computer;
  decrypting the encrypted information to retrieve the first identifier and identifying the customer's financial account by a decryption processor;
  re-encrypting the first identifier by the decryption processor;
  combining the re-encrypted first identifier with the second identifier to generate a request message by the decryption processor;
  transmitting the request message for authorization of the financial transaction over the private network to a one of the financial institutions that maintains the customer's financial; and
  receiving authorization of the financial transaction in response to the request message over the private network for the one of the financial institutions.

2. The method according to claim 1, further comprising receiving an active module from a second computer at said network access device via said public network.

3. The method according to claim 1, wherein said computer-readable portable storage medium has unencrypted information that includes an audio message pertaining to said one of the financial institutions, the method further comprising playing said audio message with the decryption processor.

4. The method according to claim 1, wherein said computer-readable portable storage medium has unencrypted information that includes advertising information pertaining to said one of the financial institutions, the method further comprising displaying said advertising information with the decryption processor.

5. The method according to claim 1, wherein said computer-readable portable storage medium is a CD-ROM.

6. The method according to claim 1, further comprising receiving a code indicating whether or not access to said customer's financial account has been approved.

7. The method according to claim 6, wherein said encrypted information further identifies said customer's address, the method further comprising displaying said customer's address on a monitor of said network access device if said code represents an access approval.

8. The method according to claim 1, wherein the request message includes a request to debit the customer's financial account by a transaction amount.

* * * * *